(12) United States Patent
Misawa

(10) Patent No.: US 7,376,501 B2
(45) Date of Patent: May 20, 2008

(54) VEHICLE HEIGHT ADJUSTMENT SYSTEM

(75) Inventor: Kenya Misawa, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 680 days.

(21) Appl. No.: 10/854,264

(22) Filed: May 27, 2004

(65) Prior Publication Data

US 2005/0010344 A1    Jan. 13, 2005

(30) Foreign Application Priority Data

Jun. 5, 2003  (JP) .............................. 2003-160230

(51) Int. Cl.
- B60G 17/016 (2006.01)
- B60G 17/017 (2006.01)
- B60G 23/00 (2006.01)

(52) U.S. Cl. ....................... 701/39; 701/37; 280/5.514; 280/5.501

(58) Field of Classification Search ............ 280/5.502, 280/5.514, 5.5, 5.507, 6.158, 6.159, 6.157, 280/6.15, 5.501; 701/37, 38, 49, 36, 2; 267/64.11
See application file for complete search history.

(56) References Cited

U.S. PATENT DOCUMENTS

| | | | | |
|---|---|---|---|---|
| 5,141,245 A | * | 8/1992 | Kamimura et al. ...... | 280/5.514 |
| 6,161,845 A | * | 12/2000 | Shono et al. .............. | 280/6.15 |
| 6,240,348 B1 | * | 5/2001 | Shono et al. .............. | 701/37 |
| 6,431,557 B1 | * | 8/2002 | Terborn et al. ............ | 280/6.15 |

FOREIGN PATENT DOCUMENTS

| | | |
|---|---|---|
| JP | 60-82421 A | 5/1985 |
| JP | 60-199714 A | 10/1985 |
| JP | 01-095921 A | 4/1989 |
| JP | 02-162109 A | 6/1990 |
| JP | 2001-047837 A | 2/2001 |
| JP | 2002-192927 A | 7/2002 |

* cited by examiner

Primary Examiner—Thomas Black
Assistant Examiner—Christine M Behncke
(74) Attorney, Agent, or Firm—Sughrue Mion, PLLC

(57) ABSTRACT

In order to prevent a vehicle from running with an inappropriate vehicle height, a vehicle height restoring speed controller determines whether the vehicle is starting or not. When the vehicle is starting, the vehicle height restoring speed controller switches a restoring speed of the vehicle height to a restoring speed for a vehicle's stopped state and not for a vehicle's running state, and provides control so that the vehicle height is swiftly adjusted to a reference vehicle height. This prevents the sustained inappropriate vehicle height, and thereby prevents the resulting hindrance to vehicle running.

4 Claims, 3 Drawing Sheets

VEHICLE HEIGHT ADJUSTMENT SYSTEM

This application claims priority from Japanese Patent Application No. 2003-160230 filed on Jun. 5, 2003, the disclosure of which is hereby incorporated by reference herein.

BACKGROUND OF THE INVENTION

1. Field of the Invention

The present invention relates to a vehicle height adjustment system for adjusting the vehicle height of a vehicle.

2. Description of the Related Art

Large vehicles such as a heavy-duty truck should desirably keep the height of a vehicle body frame (vehicle height) at a predetermined height from an axle (reference vehicle height) irrespective of the weight of loaded cargos, in order to secure a given suspension stroke to provide the ride comfort and to realize efficient reduction in vibrations of a cargo bed. Against this backdrop, these vehicles generally have air suspensions using an air spring as a chassis spring and adjust the vehicle height by controlling supply and discharge of air to/from the air spring.

Operability of the vehicle is further improved with quicker adjustment of the vehicle height to the reference vehicle height. However, such quick adjustment of the vehicle height during vehicle running is likely to disadvantageously affect running stability of the vehicle. To overcome this problem, conventional vehicle height adjustment systems have been designed to improve the running stability of the vehicle by, in a running state of the vehicle, adjusting the vehicle height to the reference vehicle height at a restoring speed slower than that in a stopped state of the vehicle (for example, see the Patent Document 1). That is, such vehicle height adjustment systems have a stop mode for high-speed adjustment of the vehicle height and a running mode for low-speed adjustment of the vehicle height, either of which is activated depending on the vehicle speed.

(Patent Document 1) Japanese Patent Laid-Open No. 2001-47837

However, the vehicle height adjustment system having such a structure as the above has its own problem. When the vehicle is started with a vehicle height inappropriate for running, the vehicle goes into the running mode for low-speed adjustment of the vehicle height, and thus the vehicle height inappropriate for running is kept for a long period of time, which probably hinders traveling of the vehicle.

SUMMARY OF THE INVENTION

The present invention has been made in consideration of the above problem, and has its object to provide a vehicle height adjustment system capable of preventing hindrance to traveling of a vehicle caused by running with an inappropriate vehicle height.

In order to achieve the above object, there is provided a vehicle height adjustment system for adjusting a vehicle height of a vehicle to a reference vehicle height. The vehicle height adjustment system comprises vehicle speed detection means for detecting a speed of the vehicle; and vehicle height restoring speed control means for controlling a restoring speed for adjusting the vehicle height to the reference vehicles height by switching between a restoring speed for a vehicle's stopped state and a restoring speed for a vehicle's running state slower than that for the vehicle's stopped state, in accordance with the speed detected by the vehicle speed detection means, wherein the vehicle height restoring speed control means determines based on the speed detected by the vehicle speed detection means whether the vehicle is in a starting state, and when determining that the vehicle is in the starting state and simultaneously determining that the vehicle height is within a predetermined range inappropriate for running, the vehicle height restoring speed control means switches the restoring speed of the vehicle height to the restoring speed for the vehicle's stopped state.

More specifically, according to the vehicle height adjustment system of the present invention, the vehicle height restoring speed control means switches the vehicle height restoring speed to the restoring speed for the vehicle's stopped state and not to the restoring speed for the vehicle's running state, and thus controls the restoring speed so as to swiftly adjust the vehicle height to the reference vehicle height, which prevents hindrance to vehicle running caused by traveling with an inappropriate vehicle height.

BRIEF DESCRIPTION OF THE DRAWINGS

The above and other features will be better understood from the exemplary embodiment described below, taken together with the drawings, of which

DETAILED DESCRIPTION OF THE PREFERRED EMBODIMENT

Referring to the accompanying drawings, the structure and operation of a vehicle height adjustment system according to a preferred embodiment of the present invention will be described in detail below.

Figure 1:
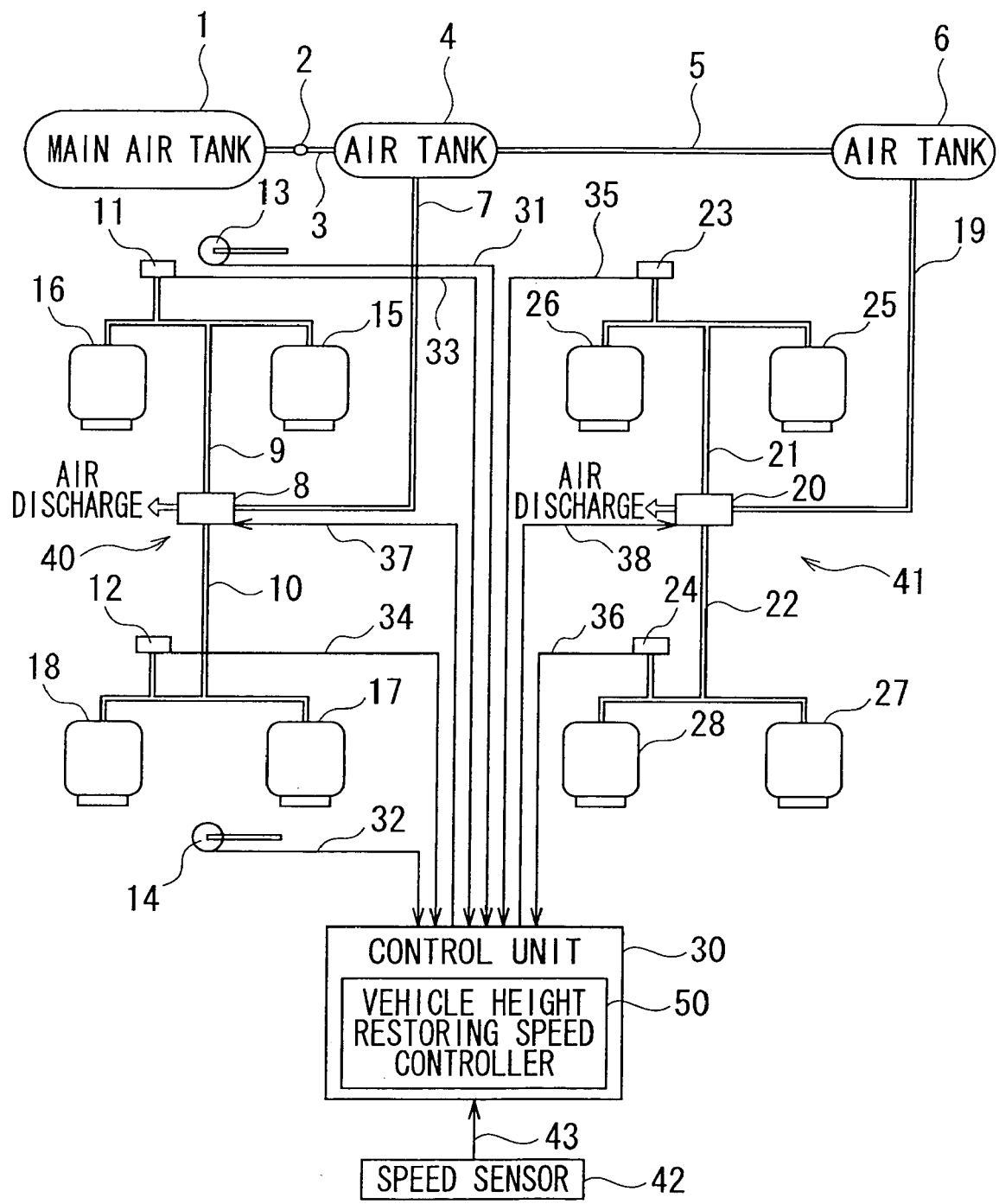
FIG. 1 is a view schematically showing an air system on a rear axle side of a vehicle having a vehicle height adjustment system according to one embodiment of the present invention.

FIG. 1 is a view schematically showing an air system on a rear axle side of a vehicle having a vehicle height adjustment system according to an embodiment of the present invention. FIG. 1 only shows the rear axle side where an axle load greatly changes when a cargo is loaded on a cargo bed, and the drawing for a front axle side, which exhibits relatively small axle load changes, is omitted.

As shown in FIG. 1, a vehicle in this embodiment has, on its rear axle side, a forward-rear axle and a rear-rear axle, both of which are not shown. The forward-rear axle is supported by a side member (not shown) with four air springs 15 to 18 interposed therebetween, and the rear-rear axle is supported by a side member (not shown) with another four air springs 25 to 28 interposed therebetween. Incidentally, the air springs 15 and 16 on a forward-rear axle side 40 are air springs for a front wheel of two right back wheels; the air springs 17 and 18 for a front wheel of two left back wheels; the air springs 25 and 26 on a rear-rear axle side 41 for a rear wheel of the two right back wheels; and the air springs 27 and 28 for a rear wheel of the two left back wheels.

An air supply side of the air system includes a compressor (not shown); a main air tank 1 in which the air from the compressor is stored; a first air tank 4 for the air springs 15 to 18 on the forward-rear axle side 40; and a second air tank 6 for the air springs 25 to 28 on the rear-rear axle side 41. The first air tank 4 on the forward-rear axle side 40 is communicatively connected with the main air tank 1 through an air passage 3. The second air tank 6 on the rear-rear axle side 41 is communicatively connected with the main air tank 1 through the air passage 3, the first air tank 4 and an air passage 5. These first and second air tanks 4 and 6 on the forward and rear-rear axle sides 40 and 41, respectively, each store air to be supplied to an undermentioned air consumption side in a high-pressure state.

The air passage 3 is provided with a safety valve 2 for preventing the internal pressure of the main air tank 1 from reducing to a predetermined value or under. In other words, when the internal pressure of the main air tank 1 is reduced to the predetermined value or under for some reason while the vehicle is running or the like, the safety valve 2 stops supplying air from the main air tank 1 to the first and second air tanks 4 and 6. Thus, the pressure of the air to be supplied from the main air tank 1 to a low-pressure air system and the like including a brake system (not shown) is maintained, and the safety of the vehicle can be ensured.

The air consumption side of the air system includes a magnetic valve 8 and the air springs 15 to 18 on the forward-rear axle side 40; and a magnetic valve 20 and the air springs 25 to 28 on the rear-rear axle side 41. The magnetic valve 8 on the forward-rear axle side 40 is communicatively connected with the first air tank 4 through an air passage 7. The magnetic valve 20 on the rear-rear axle side 41 is communicatively connected with the second air tank 6 through an air passage 19.

Moreover, the magnetic valve 8 on the forward-rear axle side 40 is communicatively connected with the air springs 15 and 16 through an air passage 9, and with the air springs 17 and 18 through an air passage 10. The magnetic valve 20 on the rear-rear axle side 41 is communicatively connected with the air springs 25 and 26 through an air passage 21, and with the air springs 27 and 28 through an air passage 22. The magnetic valve 8 on the forward-rear axle side 40 is coupled to a control unit 30 through a signal line 37. Open/close control signals sent from this control unit 30 controls the air supply/discharge operation whether to supply air from the first air tank 4 to the air springs 15 to 18 or to discharge air from the air springs 15 to 18.

Furthermore, the magnetic valve 20 on the rear-rear axle side 41 is coupled to the control unit 30 through a signal line 38, and control signals sent from this control unit 30 controls the air supply/discharge operation whether to supply air from the second air tank 6 to the air springs 25 to 28 or to discharge air from the air springs 25 to 28.

A pressure sensor 11 is provided in the air passage 9 on the forward-rear axle side 40, for detecting the internal pressure of the air passage 9, that is, the internal pressure of the air springs 15 and 16. Similarly, a pressure sensor 12 for detecting the internal pressure of the air springs 17 and 18 is provided in the air passage 10. Moreover, a pressure sensor 23 for detecting the internal pressure of the air springs 25 and 26 is provided in the air passage 21 on the rear-rear axle side 41. Similarly, a pressure sensor 24 for detecting the internal pressure of the air springs 27 and 28 is provided in the air passage 22. The pressure sensor 11 is coupled to the control unit 30 through a signal line 33, and similarly, pressure sensors 12, 23 and 24 are each coupled to the control unit 30 through signal lines 34, 35 and 36, respectively. Values of the internal pressures detected by the respective pressure sensors 11, 12, 23, and 24 are sent to the control unit 30 through the respective signal lines 33, 34, 35 and 36.

The vehicle height adjustment system of the present invention has height sensors 13 and 14 for detecting the height position of the rear axle relative to the side member, that is, the vehicle height of the rear axle side. Incidentally, the height sensor 13 detects the vehicle height of the right rear axle side, and the height sensor 14 detects the vehicle height of the left rear axle side. The height sensor 13 is coupled to the control unit 30 through a signal line 31, and the height sensor 14 is coupled to the control unit 30 through a signal line 32. Vehicle height measured values detected by these height sensors 13 and 14 are sent to the control unit 30 through the signal lines 31 and 32, respectively. For an agreement between a current vehicle height measured value outputted from the height sensors 13 and 14 and a value of the reference vehicle height, the control unit 30 controls the magnetic valves 8 and 20 so as to supply air from the first and second air tanks 4 and 6 to the air springs 15 to 18 and 25 to 28, respectively, and to discharge air from the air springs 15 to 18 and 25 to 28 to the atmosphere.

Furthermore, the vehicle height adjustment system according to the present invention further has a speed sensor 42 functionable as vehicle speed detection means according to the present invention. The speed sensor 42 detects a speed of the vehicle and sends the detected value to the control unit 30 through a signal line 43. The control unit 30 has a vehicle height restoring speed controller 50 functionable as vehicle height restoring speed control means according to the present invention. The vehicle height restoring speed controller 50 controls the speed of restoring the vehicle height by switching a restoring speed mode between a vehicle stopped mode and a vehicle running mode in accordance with the running speed detected by the speed sensor 42, the vehicle stopped mode being designed so that the current vehicle height is adjusted to the reference vehicle height at a restoring speed V1, and the vehicle running mode being designed so that the current vehicle height is adjusted to the reference vehicle height at a restoring speed V2 (<V1).

Figure 2:
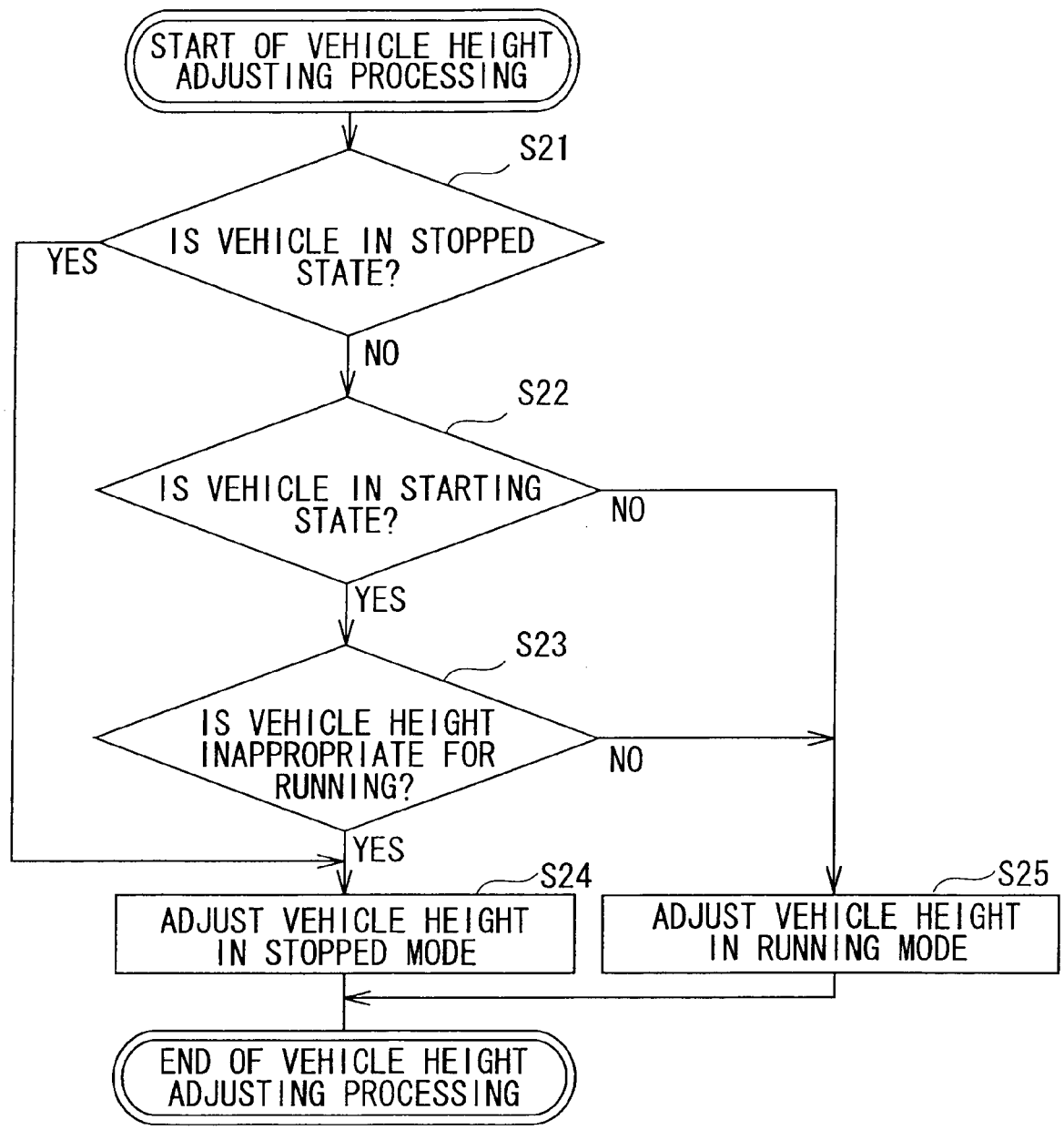
FIG. 2 is a flowchart showing a flow of vehicle height adjusting processing executed by the vehicle height adjustment system according to the embodiment of the present invention.

More specifically, referring to the flowchart in FIG. 2, the vehicle height restoring speed controller 50 first determines whether the vehicle is in a stopped state, based on the value detected by the speed sensor 42 (Step S21). When it determines that the vehicle is in the stopped state, the vehicle height restoring speed controller 50 controls the magnetic valves 8 and 20 so as to adjust the current vehicle height to the reference vehicle height in the vehicle stopped mode (restoring speed V1) (Step S24). In contrast, when the vehicle is not in the stopped state but in the running state, the vehicle height restoring speed controller 50 determines whether a specified period of time has elapsed since the vehicle went into a predetermined running speed condition, and thereby determines whether the vehicle is in a starting state (Step S22).

When the vehicle height restoring speed controller 50 determines that the vehicle is not in the starting state because the specified period of time has elapsed since the vehicle went into the predetermined running speed condition, the vehicle height restoring speed controller 50 controls the magnetic valves 8 and 20 so as to adjust the vehicle height to the reference vehicle height in the vehicle running mode (restoring speed V2) (Step S25). In contrast, when the vehicle is in the starting state because the elapsed time since the vehicle went into the predetermined running speed condition has not reached the specified period of time, the vehicle height restoring speed controller 50 determines whether the current vehicle height is inappropriate for running (Step S23). When it determines that the current vehicle height is not inappropriate for running, the vehicle height restoring speed controller 50 controls the magnetic valves 8 and 20 so as to adjust the current vehicle height to the reference vehicle height in the vehicle running mode (restoring speed V2) (Step S25). When the current vehicle height is inappropriate for running, the vehicle height restoring speed controller 50 controls the magnetic valves 8 and 20 so as to adjust the current vehicle height to the reference vehicle height in the vehicle stopped mode (restoring speed V1) (Step S24). The above is a series of vehicle height adjusting processes, and the vehicle height restoring speed controller 50 executes the vehicle height adjusting processes every time the vehicle height changes.

As is clear from the above description, in the vehicle height adjustment system according to the embodiment of the present invention, the vehicle height restoring speed controller 50 switches a vehicle height restoring speed mode to the stopped mode and not to the running mode when the vehicle is in the starting state, and provides control such that the vehicle height is swiftly adjusted to the reference vehicle height, thus preventing hindrance to vehicle running caused by long-sustained inappropriate vehicle height.

While the above description has been given of the preferred embodiment when the invention made by the present inventor is applied, the present invention is by no means limited to the description and accompanying drawings making up part of the disclosure of the present invention according to this embodiment.

For example, in order to improve the performance of cargo handling onto a platform, there are some cases where a manual vehicle height adjuster allowing voluntary adjustment of vehicle height in the vehicle's stopped state is provided, which is described in detail in the Japanese Patent Application Laid-Open No. 2002-192927. In this case, the following modification is also allowable.

Figure 3:
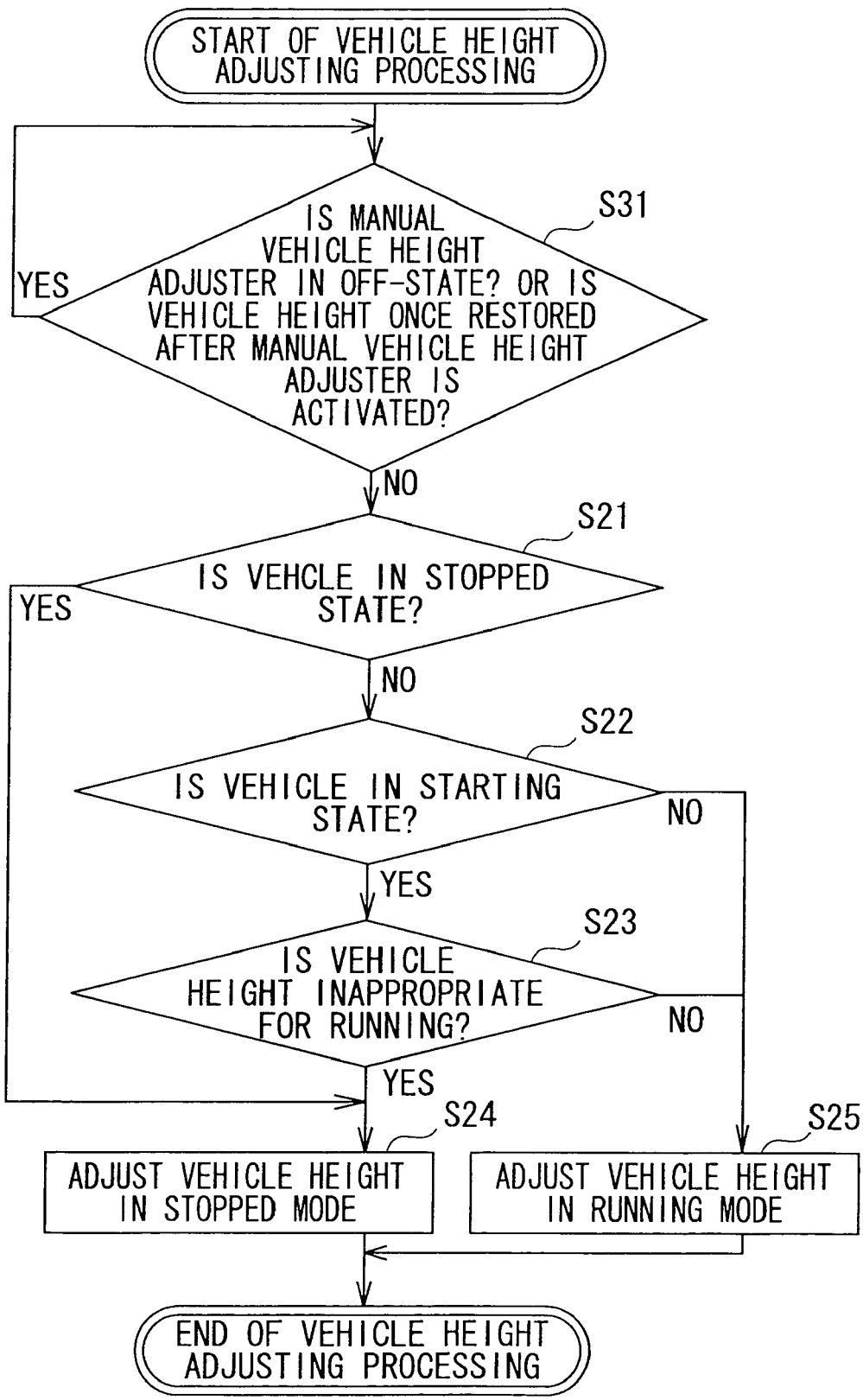
FIG. 3 is a flowchart showing a flow of an application example of the vehicle height adjusting processing executed by the vehicle height adjustment system according to the embodiment of the present invention.

As indicated in the flowchart in FIG. 3, the vehicle height restoring speed controller 50 determines, when the vehicle is started, whether the manual vehicle height adjuster for manually adjusting the vehicle height is being operated (Step S31). When the manual vehicle height adjuster is in an ON-state, or when the vehicle height is not restored once to the reference vehicle height after the manual vehicle height adjuster is set to an OFF-state, the vehicle height restoring speed controller 50 may control the magnetic valves 8 and 20 so as to adjust the vehicle height to the reference vehicle height in the vehicle stopped mode (restoring speed V1).

This allows the vehicle height adjustment in the running mode and not in the stopped mode, even when the vehicle goes into the starting state with an inappropriate vehicle height due to abrupt load changes in the stopped state. Therefore, when such abrupt load changes are caused in an unstable state of the vehicle, the vehicle height is adjusted in the running mode for low-speed vehicle height adjustment, so that the vehicle may not become unstable.

It is to be understood that any and all different embodiments, modifications or operating techniques which may be made by a person skilled in the art based on the aforementioned embodiment should be considered to be within the scope of the present invention.

As described above, according to the vehicle height adjustment system according to the present invention, it is possible to prevent hindrance to vehicle traveling caused by running with an inappropriate vehicle height.

What is claimed is:

1. A vehicle height adjustment system for adjusting a vehicle height of a vehicle to a reference vehicle height, comprising:

vehicle speed detection means for detecting a speed of the vehicle; and vehicle height restoring speed control means for controlling a restoring speed of adjusting the vehicle height to the reference vehicle height by switching between a restoring speed for a vehicle's stopped state and a restoring speed for a vehicle's running state, which is slower than that for the vehicle's stopped state, in accordance with the speed detected by the vehicle speed detection means, wherein the vehicle height restoring speed control means determines based on the speed detected by the vehicle speed detection means whether the vehicle is in a starting state, and when determining that the vehicle is in the starting state and simultaneously determining that the vehicle height is within a predetermined range inappropriate for running, the vehicle height restoring speed control means switches the restoring speed of the vehicle height to the restoring speed for the vehicle's stopped state.

2. The vehicle height adjustment system according to claim 1, further comprising:

manual vehicle height adjusting means for manually adjusting the vehicle height, wherein the vehicle height restoring speed control means switches the vehicle height restoring speed to the restoring speed for the vehicle's stopped state, only either when the manual vehicle height adjusting means is activated or when the vehicle height is not restored once after the manual vehicle height adjusting means is inactivated.

3. A vehicle height adjustment method for adjusting a vehicle height of a vehicle to a reference vehicle height, said method comprising:

detecting a speed of the vehicle;

controlling a restoring speed of adjusting the vehicle height to the reference vehicle height by switching between a restoring speed for a vehicle's stopped state and a restoring speed for a vehicle's running state, which is slower than that for the vehicle's stopped state, in accordance with the detected speed; and determining, based on the detected speed, whether the vehicle is in a starting state, and when determining that the vehicle is in the starting state and simultaneously determining that the vehicle height is within a predetermined range inappropriate for running, switching the restoring speed of the vehicle height to the restoring speed for the vehicle's stopped state.

4. The vehicle height adjustment method according to claim 3, further comprising:

manually adjusting the vehicle height at a manual vehicle height adjuster; and switching the vehicle height restoring speed to the restoring speed for the vehicle's stopped state, only either when the manual vehicle height adjuster is activated or when the vehicle height is not restored once after the manual vehicle height adjuster is inactivated.

* * * * *